United States Patent
Malhotra et al.

(10) Patent No.: US 9,300,995 B2
(45) Date of Patent: Mar. 29, 2016

(54) METHOD OF RECOMMENDING EVENTS ON AN ELECTRONIC DEVICE

(71) Applicant: Wipro Limited, Bangalore (IN)

(72) Inventors: Rani Malhotra, Bangalore (IN); Sangeeta Parida, Bangalore (IN)

(73) Assignee: Wipro Limited, Bangalore (IN)

( * ) Notice: Subject to any disclaimer, the term of this patent is extended or adjusted under 35 U.S.C. 154(b) by 82 days.

(21) Appl. No.: 14/191,050

(22) Filed: Feb. 26, 2014

(65) Prior Publication Data

US 2015/0195618 A1    Jul. 9, 2015

(30) Foreign Application Priority Data

Jan. 9, 2014 (IN) .............................. 98/CHE/2014

(51) Int. Cl.

| | |
|---|---|
| *H04N 5/445* | (2011.01) |
| *H04N 21/25* | (2011.01) |
| *H04N 21/234* | (2011.01) |
| *H04N 21/266* | (2011.01) |
| *H04N 21/4722* | (2011.01) |
| *H04N 21/482* | (2011.01) |
| *H04N 21/658* | (2011.01) |
| H04N 21/258 | (2011.01) |

(52) U.S. Cl.
CPC ....... *H04N 21/251* (2013.01); *H04N 21/23418* (2013.01); *H04N 21/266* (2013.01); *H04N 21/4722* (2013.01); *H04N 21/4826* (2013.01); *H04N 21/6581* (2013.01); *H04N 21/25891* (2013.01)

(58) Field of Classification Search
CPC .............................................. H04N 21/25891

USPC ............................................................ 725/39
See application file for complete search history.

(56) References Cited

U.S. PATENT DOCUMENTS

| | | | | |
|---|---|---|---|---|
| 6,065,042 | A * | 5/2000 | Reimer et al. | 709/203 |
| 7,840,980 | B2 * | 11/2010 | Gutta | 725/46 |
| 8,732,758 | B2 * | 5/2014 | Boyer et al. | 725/46 |
| 2009/0262238 | A1 | 10/2009 | Hope et al. | |
| 2010/0095345 | A1 | 4/2010 | Tran et al. | |

FOREIGN PATENT DOCUMENTS

WO      2008075356 A2    6/2008

* cited by examiner

*Primary Examiner* — Michael Hong
(74) *Attorney, Agent, or Firm* — LeClairRyan, a Professional Corporation

(57) ABSTRACT

This technology provides a method, non-transitory computer readable medium and device that recommends one or more events on an electronic device. The electronic device provides an event to the user. The user selects a frame to obtain certain information. The electronic device detects frame number and event identification (ID) number associated with selected frame and provides frame number and event ID number to recommendation server for identifying attributes and values. The recommendation server identifies the attributes and values associated with the selected frame. Thereafter, the recommendation server provides the attributes and the values to the electronic device for selection of at least value by the user. The electronic device provides selected values to the recommendation server. The recommendation server searches listing of plurality of events to determine one or more events having the selected values. The recommendation server may then provide the list of one or more events having the selected values to the electronic device.

15 Claims, 11 Drawing Sheets

METHOD OF RECOMMENDING EVENTS ON AN ELECTRONIC DEVICE

This application claims the benefit of Indian Patent Application No. 98/CHE/2014 filed Jan. 9, 2014, which is hereby incorporated by reference in its entirety.

FIELD

This technology disclosure relates to media broadcast technologies. In particular, the present disclosure relates to a method of recommending events on an electronic device.

BACKGROUND

With the advent of digital television system, it has become possible for users to enjoy diversified multimedia contents. A typical digital television provides hundreds of program channels having various demographics. On the one hand, the numerous choices on the program channels are a boon for users due to the varied range of programs available. However, on the other hand, choosing and tuning into a particular program of choice out of the numerous options available has become a difficult task for the users on account of the numerous options available. Trying to find a program channel of interest may involve the user cycling through the large number of program channels until a favorable channel is found. This is both time consuming and frustrating for the user.

Digital broadcasting includes a large amount of program information that is transmitted as an Electronic Program Guide (EPG) that allows users to select and view the desired program. EPG lists out the various broadcast programs scheduled on the various program channels and helps the user to a certain extent to find a program of interest. The user may go over the EPG to locate a program of interest. However, trying to find a program of interest using the EPG has the same drawbacks as cycling through the program channels to find a program of interest. The effort to go through the significantly high number of entries corresponding to the large number of program channels could be time intensive and also lead to frustration of the user.

To ease the efforts required by the user, certain EPGs allow the user to search the EPG using one or more keywords to find a program of interest. However, oftentimes users may not have a definite idea as to what they would like to watch and hence may not come up with relevant keywords with which to query the EPG. For example, a user may like an attribute corresponding to the media content and may desire to know other programs having the attribute. Since, the user may be unaware of the names of the other programs; the user may not be able to provide the relevant keyword and hence may not be able to identify the other programs having the liked attribute.

Hence, there exists a need for a method to recommend events on an electronic device by reducing the complexity of searching for the program of interest in the entire EPG and by reducing time to search for the program of interest.

SUMMARY

The shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

The present disclosure provides a method of recommending events on an electronic device. The method comprises receiving at a recommendation server, event identification (ID) number and a frame number associated with a frame selected by a user. The recommendation server may identify at least one attribute and at least one value associated with each of the at least one attribute in the frame. Upon identifying the at least one attribute and the corresponding value, the recommendation server may search a listing of a plurality of events to determine one or more events having the at least one value. Thereafter, the recommendation server provides a list of the one or more events having the at least one value to the electronic device.

The present disclosure provides a method of recommending events on an electronic device. The method comprises receiving, at an electronic device, a selection of a frame from an event provided to a user. Thereafter, the electronic device may identify at least one attribute and at least one value associated with each of the at least one attribute in the frame. Upon identifying the at least one attribute and the value, the electronic device may search a listing of a plurality of events to determine one or more events having the at least one value. Thereafter, the electronic device may display a list of the one or more events on a display.

The present disclosure provides a recommendation server for recommending events on an electronic device. The recommendation server comprises at least one processor and a memory storing instructions executable by the at least one processor, wherein the instructions configure the at least one processor to receive an event identification (ID) number and a frame number associated with a frame selected by a user, identify at least one attribute and at least one value associated with each of the at least one attribute in the frame, search a listing of a plurality of events to determine one or more events having the at least one value and provide a list of the one or more events to the electronic device.

The present disclosure provides an electronic device for recommending events. The electronic device comprises at least one processor and a memory storing instructions executable by the at least one processor, wherein the instructions configure the at least one processor to receive a selection of a frame from an event provided to a user, identify at least one attribute and at least one value associated with each of the at least one attribute in the frame, search a listing of a plurality of events to determine one or more events, having the at least one value and display a list of the one or more events having the at least one value on the display.

The present disclosure provides a non-transitory computer readable medium including operations stored thereon that when processed by at least one processor cause a recommendation server to perform the acts of receiving an event identification (ID) number and a frame number associated with a frame selected by a user, identifying at least one attribute and at least one value associated with each of the at least one attribute in the frame, search a listing of a plurality of events to determine one or more events having the at least one value and providing a list of the one or more events having the at least one value to the electronic device.

The foregoing summary is illustrative only and is not intended to be in any way limiting. In addition to the illustrative aspects and features described above, further aspects, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

Figure 1:
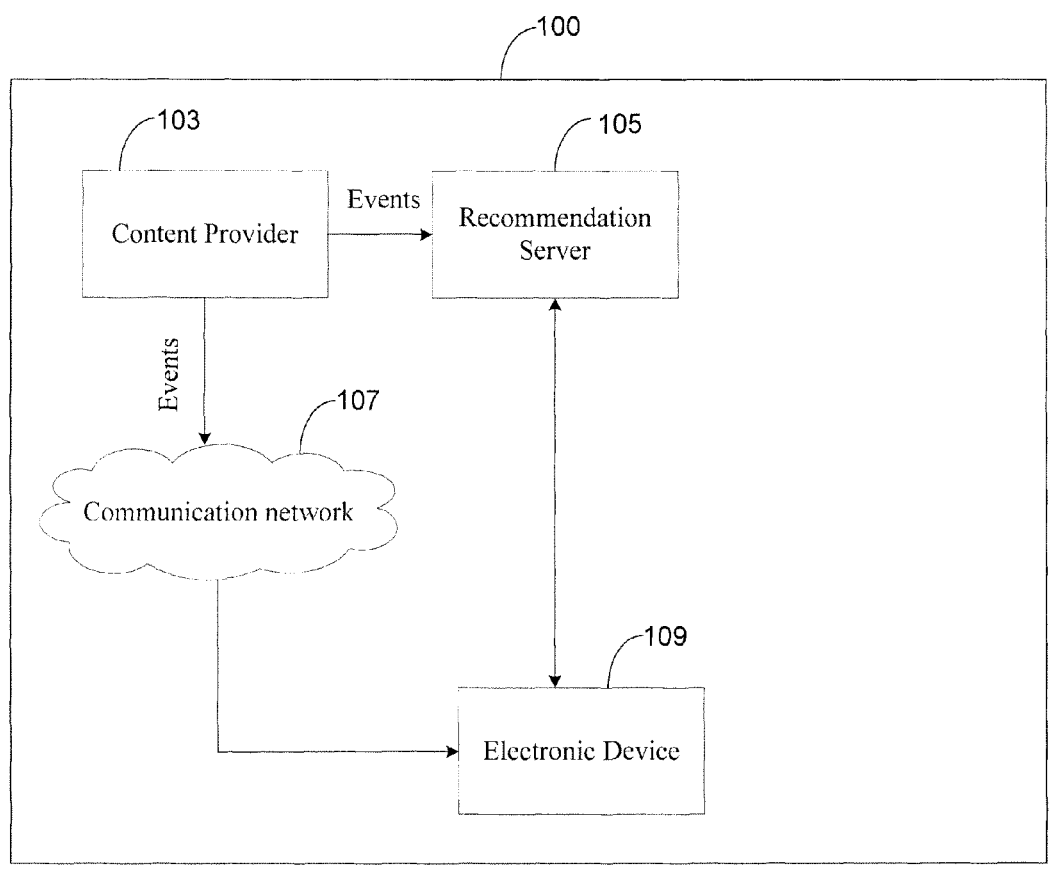
FIG. 1 illustrates an environment for recommending events on an electronic device in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

As used herein, the terms "content provider" refers to a service provider or broadcaster of audio and video contents, "recommendation server" refers to a server associated with the content provider, "events" refer to any television program or recorded video, "electronic device" refers to an information appliance such as, but not limited to, a set-top box and a digital television.

Embodiments of the present disclosure relate to an intuitive event information search in a Digital Television system. More particularly, a method of recommending events on an electronic device based on inputs received from a user is disclosed. The event recommendation method includes detecting a frame selected by a user from a currently playing event, for example a broadcast program, and identifying attributes, including, but not limited to, actor, location and landmark present in the selected frame. Values associated with the attributes such as name of an actor, name of the location, etc. may also be determined Upon identifying the attributes and their values, a search may be performed in the broadcast metadata or an Electronic Program Guide (EPG) to determine one or more events having values matching the values associated with the frame selected by the user. The one or more events having values matching the values may then be presented to the user. In some embodiments, the one or more events matching the values are presented to the user in the form of a list.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

FIG. 1 illustrates an exemplary environment 100 for recommending events on an electronic device 109 in accordance with some embodiments of the present disclosure. The environment 100 includes a content provider 103, a recommendation server 105, a communication network 107 and an electronic device 109. The content provider 103 may be a broadcaster that provides one or more events. In some other embodiments, the content provider 103 may be a video sharing website. The content provider 103 may provide the one or more events to the electronic device 109 through a communication network 107. The communication network may include, but is not limited to, satellite, cable and Internet. The one or more events include, but are not limited to, a recorded video and television programs. The electronic device 109 includes, but not limited to, a set top box, a digital TV and a digital video recorder. The content provider 103 may be associated with a recommendation server 105. The recommendation server 105 comprises a processor and a memory. The recommendation server 105 receives event record associated with each event from the content provider 103. The event records are stored in the memory of the recommendation server 105. The event record includes, event identification (ID) number, attributes and values in the event, set of frame ranges associated with each value in the event, number of frames (alternatively referred as frame count) for each value in the event and bookmarks associated with each value in the event. The attributes includes, but not limited to actors, location, landmark and things. The value is the name given to the attribute. For example, if the attribute is "Actor" then the value is name of the Actor. Similarly, if the attribute is "Location" then the value is name of the Location. The set of frame ranges associated with each value indicates the range of frames in which the value is present. The frame count for a value indicates the number of frames in which the value is present.

In some exemplary embodiments, the content provider 103 may broadcast an event to the electronic device 109. In one embodiment, the electronic device 109 may be associated with a display 111 on which the event is presented. The user viewing the event may select a particular scene in the event for which the user requires information.

Figure 2A:
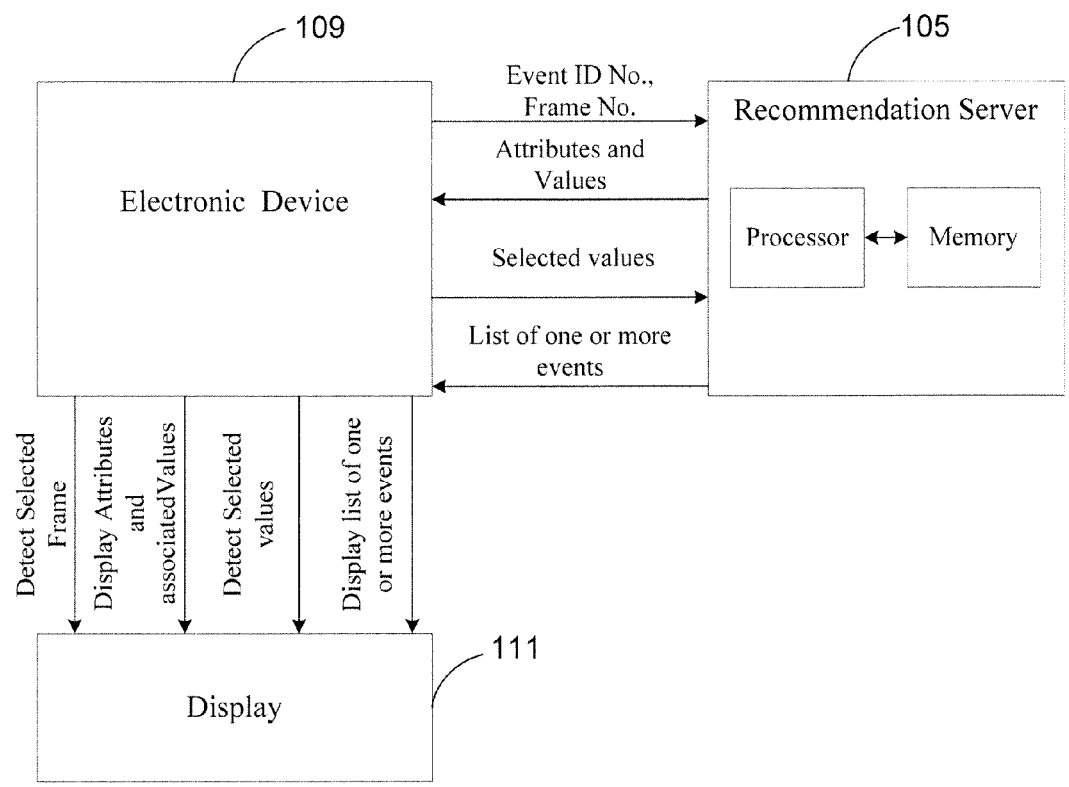
FIG. 2a illustrates an exemplary process of recommending events on an electronic device upon identifying attributes and associated values in a selected frame of an event in accordance with some embodiments of the present disclosure.

FIG. 2a illustrates an exemplary process of recommending events on an electronic device 109 upon identifying attributes and associated values in a selected frame of an event in accordance with some embodiments of the present disclosure. Initially, a user may select a particular scene in the event presented on the display 111. The user may select a particular scene from the presented event by one or more means including pausing the event. It will be apparent to a person skilled in the art that various input devices, including but not limited to, a television remote control, a mouse, a track pad, and a stylus may be used to interact with the electronic device 109 in order to pause the event. When the user selects the particular scene, the electronic device 109 may detect the frame number associated with the selected scene and the event ID number associated with the event which the selected scene is a part of. In some embodiments, the frame number may be detected based on the frame rate. Using the frame rate and the time into the event when the user selects the scene, the corresponding frame number may be computed. It will be apparent to a person skilled in the art that other mechanisms to determine frame number may be employed without deviating from the scope of the present disclosure.

On determining the event ID and the frame number, the electronic device 109 may provide the frame number and the event ID number to the recommendation server 105. The processor in the recommendation server 105 may then compare the received event ID number with a plurality of event ID numbers stored in the memory to identify a matching event ID number. The processor may retrieve the event record associated with the matched event ID number. The event record provides information about the attributes and values in the event corresponding to the matched event ID number. The event record also provides information about the set of frame ranges and the frame count associated with the values. Using the frame number provided by the electronic device 109, the recommendation server 105 may determine one or more attributes and values associated with the frame selected by the user. This may be done by comparing the frame number against the event record maintained by the recommendation server 105 for the event. Initially, the frame number may be compared with the frame ranges in the event record to determine which frame range the selected frame falls under. Upon determining the frame range, the processor identifies the attributes and the values associated with the frame range. Thereafter, the recommendation server 105 may provide the identified attributes and the values to the electronic device 109. The electronic device 109 displays the attributes and the values on the display 111. The user may select at least one value among the displayed attributes and the values. The electronic device 109 detects the selection of at least one value and then provides the selected at least one value to the recommendation server 105. The processor in the recommendation server 105 may then search a listing of plurality of events to determine one or more events having the selected at least one value.

In some embodiments, the processor may identify the number of frames in each of the identified one or more events having the identified value. Based on the number of frames, the processor may define an order in which the list of one or more events is to be provided to the user. Thereafter, recommendation server 105 may provide the ordered list of one or more events to the electronic device 109. The electronic device 109 may display the event list on the display 111. The recommendation server 105 may also provide information about the one or more events in the list such as, but not limited to, the channel in which the event is being displayed, whether the event is being displayed currently on any other channel and the starting time of the event.

Figure 2B:
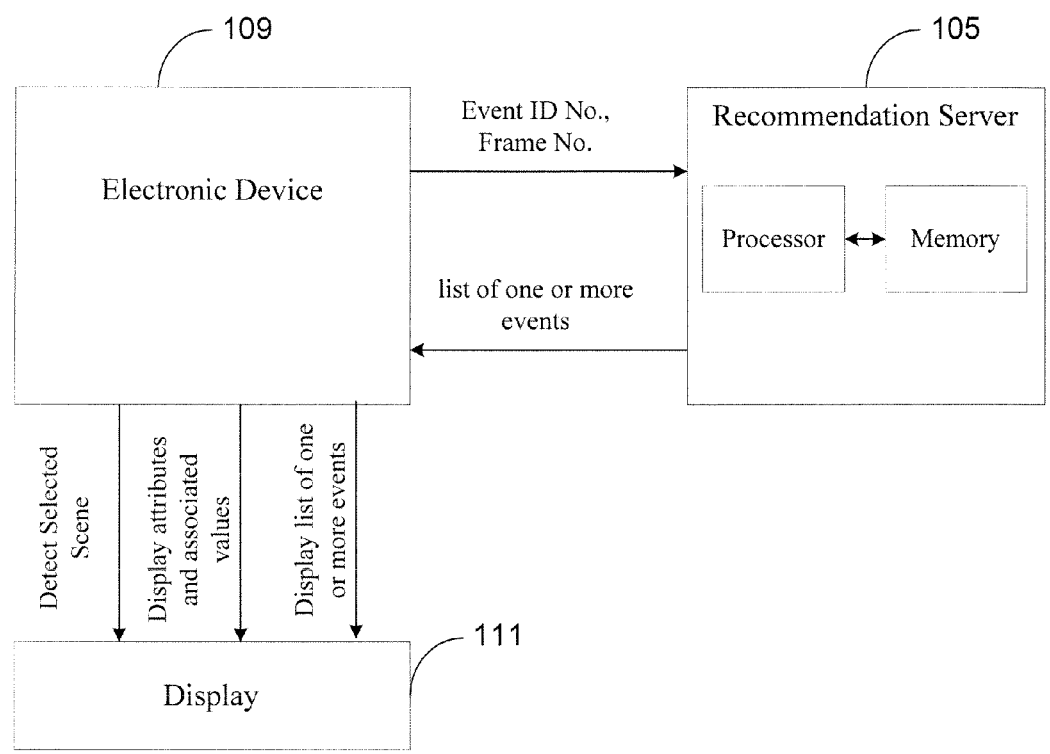
FIG. 2b illustrates an exemplary process of recommending events on an electronic device upon identifying a single attribute and value in a selected frame of an event in accordance with another some embodiments of the present disclosure.

FIG. 2b illustrates an exemplary process of recommending events on an electronic device upon identifying a single attribute and value in a selected frame of an event in accordance with some embodiments of the present disclosure. When the user selects a particular scene in the event presented on the display, the electronic device 109 detects the frame number and the event ID number associated with the selected scene in the event. The electronic device 109 provides the frame number and the event ID number to the recommendation server 105. The process of identifying the attributes and the values in the selected frame is explained in conjunction with FIG. 2a. If the processor in the recommendation server 105 identifies that there is a single attribute and value associated with the frame range, the recommendation server 105 may provide the identified attribute and the value to the electronic device 109. The electronic device 109 may then display the attribute and the value on the display so that the user may select the value to be searched as described in conjunction with FIG. 2a. In some other embodiments, the list of events matching the single value may be directly provided to the user.

When the list of one or more events is displayed on the display 111, in some embodiments, the user may be provided with an option to request for bookmarks associated with the event. Here, a bookmark may correspond to a pointer in the video where a particular value appears. There may be multiple bookmarks associated with a value depending on the number of frames or frame ranges that the value is associated with. Bookmarks may be provided to a user to allow the user to skip or jump directly to a scene or portion of a video associated with the preferred value of the user. For example, if the user selects a recorded video on a video sharing site for having the value "Himalayas", then the user may quickly skip to those sections in the video having the value "Himalayas" as opposed to viewing the entire video. In this case, the bookmarks or pointers for the various values may be inserted in the video by the content provider. In other words, frames or frame ranges having a particular value may be tagged with a bookmark corresponding to that value. In some other embodiments, the selected event may be a future event to be broadcasted. In this case, a reminder may be automatically set to remind the user at the start of the event.

Figure 3A:
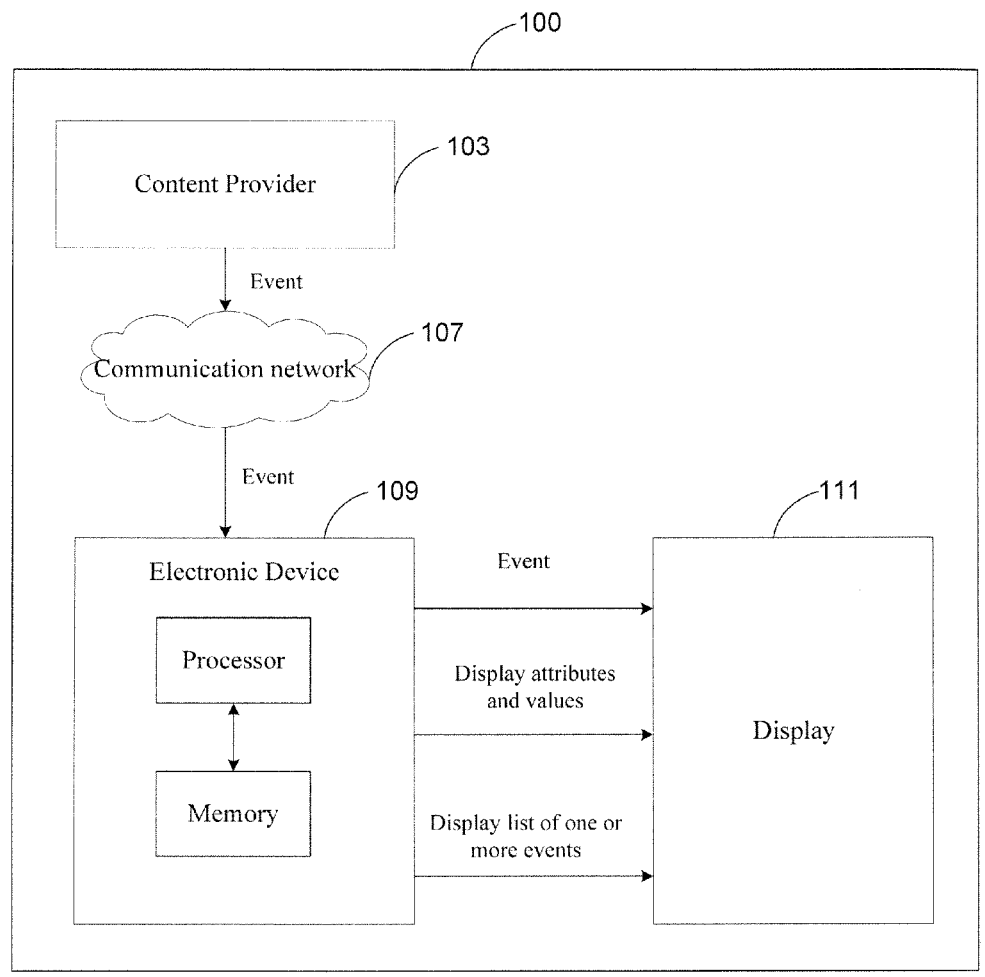
FIG. 3a illustrates an exemplary environment for recommending events by an electronic device in accordance with an embodiment of the present disclosure.

FIG. 3a illustrates an exemplary environment 100 for recommending events by an electronic device 109. In some embodiments, the electronic device 109 may be a set-top box. The electronic device 109 may include a processor and a memory. The electronic device 109 may further be associated with a display 111. The user may select a frame from the event being displayed on the display 111. The processor detects the frame number and the event ID number associated with the frame selected by the user. The processor identifies the attributes and the values in the selected frame from an event record as described in conjunction with FIG. 2a. In this case, the content provider or the broadcaster may provide the event record for each event along with the EPG. In some embodiments the event record may be provided as metadata along with the event itself. The electronic device 109 provides the attributes and values to the display 111 for selection of at least one value by the user. Based on the selected value, the processor may search through a plurality of event records associated with current and future events to determine one or more events that have the at least one value selected by the user. The one or more events having the at least one value may then be recommended to the user. The user may then select an event from the recommended events to directly jump to the event. If the event is a future event, then a reminder may be set to remind the user at the start of the event.

Figure 3B:
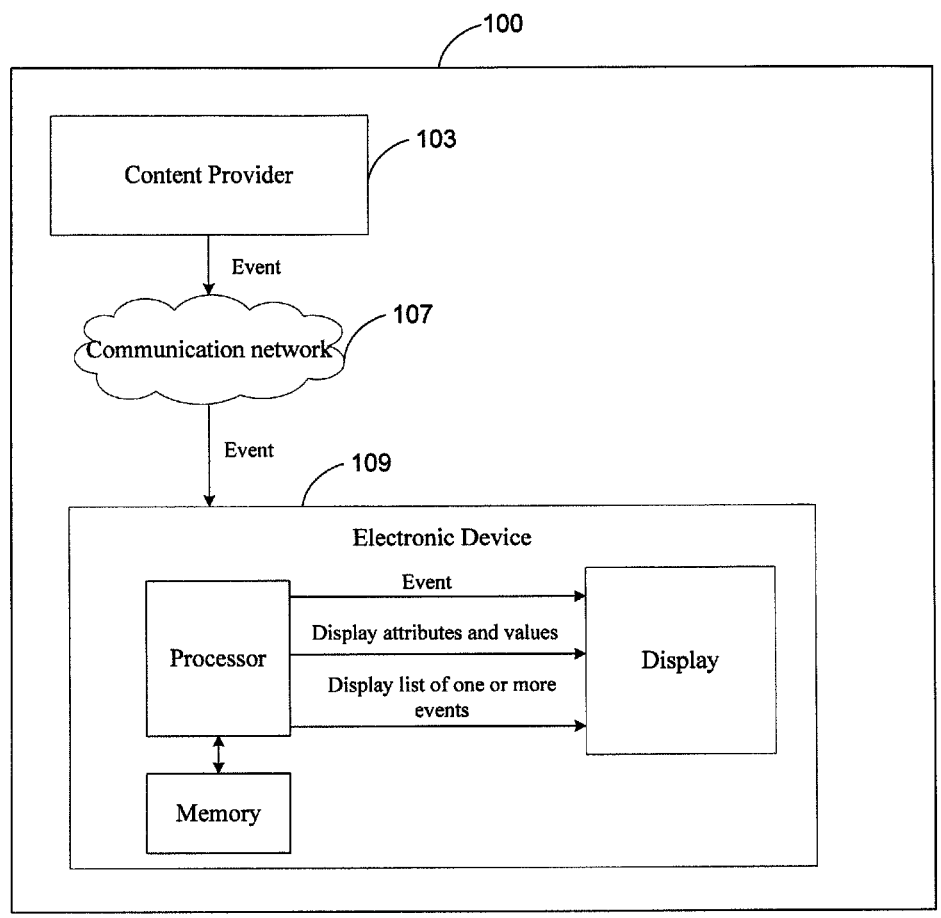
FIG. 3b illustrates another exemplary environment for recommending events by an electronic device in accordance with an embodiment of the present disclosure.

FIG. 3b illustrates another exemplary environment 100 for recommending events by an electronic device 109. The electronic device may be digital television. The electronic device 109 includes a processor, memory and a display. The processor displays the event on the display. The user may select a frame from the event being displayed on the display. The processor detects the frame number and the event ID number associated with the frame selected by the user. Thereafter, the processor identifies the attributes and the values in the selected frame and displays the identified attributes and the values on the display for selection of at least one value by the user. Based on the selected value, the processor searches the listing of plurality of events to determine one or more events having the selected value from the memory. Thereafter, the processor displays the list of one or more events on the display.

Figure 4A:
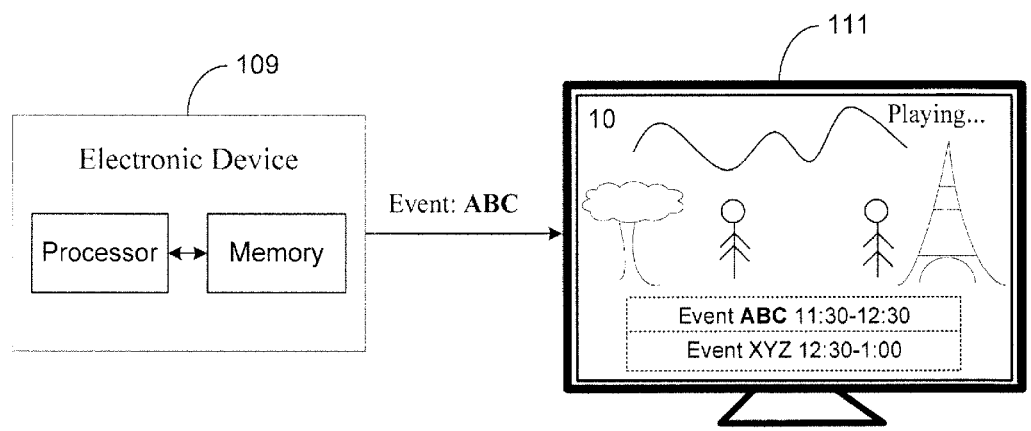
FIGS. 4a-4f illustrates an exemplary environment for recommending events on an electronic device in accordance with some embodiments of the present disclosure.
Figure 4B:
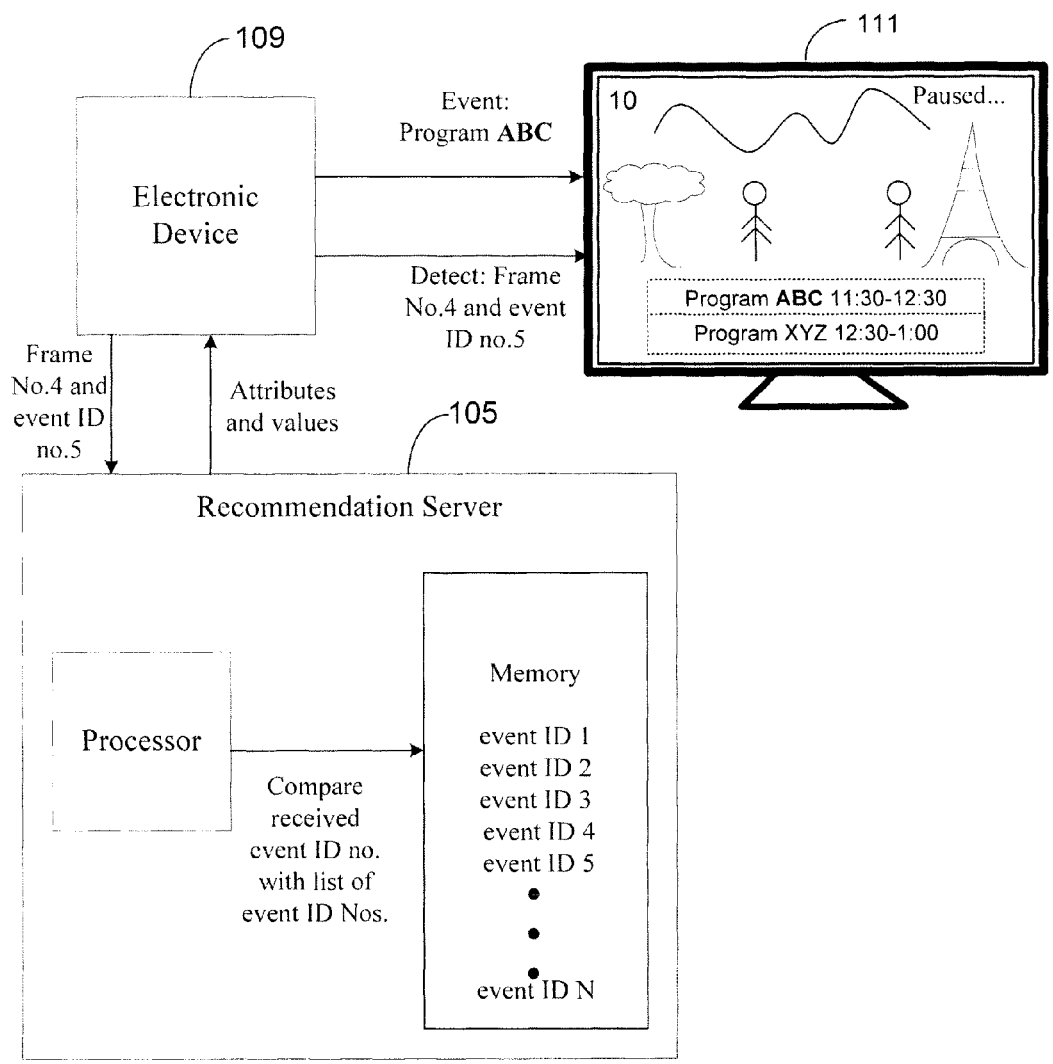

Now, the method of recommending events is explained with at least one example for the purposes of illustration only. However such example should not be construed as limitation of the instant disclosure. The person skilled in the art readily understands that such illustrations can be applied on various other technical fields or environments. FIGS. 4a-4f illustrates an exemplary environment 100 for recommending events on an electronic device 109. The electronic device 109 provides an event namely "ABC" to the display 111 as shown in FIG. 4a. The electronic device 109 comprises a processor and a memory. The memory stores the event ID number associated with the event "ABC" and the number of frames in the event "ABC". As an example, the event "ABC" may comprise 10 frames and the event ID number for the event "ABC" is 5. The event "ABC" may be broadcasted on channel no. 10 as indicated in the left corner of the display 111. The display 111 also indicates the current event name, time duration and also the upcoming event name and time duration. The user viewing the event "ABC" may pause the event as the user wishes to obtain certain information as shown in FIG. 4b. The event "ABC" is paused using the preconfigured key sequence provided on the remote controller associated with the electronic device 109. When the event is paused, the electronic device 109 detects the frame number of the paused scene. For example, the detected frame number may be 4 and the event ID number may be 5. The electronic device 109 provides the frame number and the event ID number to the recommendation server 105. The processor in the recommendation server 105 compares the received event ID number with list of event ID numbers stored in the memory. The processor retrieves the event record associated with the matched event ID 5.

Figure 4C:
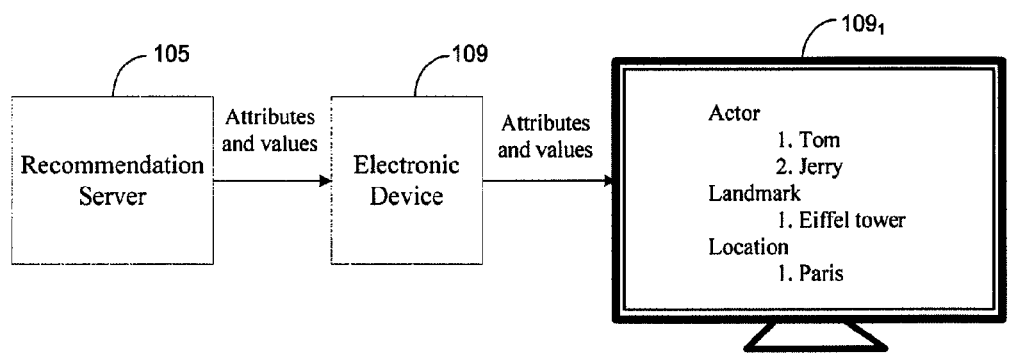

The event record associated with the event ID 5 comprises 10 frames and the attributes and values in the event corresponding to event ID 5 may be Actors "Tom", "Jerry", "Jack", "Jill", Landmark "Eiffel Tower", "Taj Mahal" and Location "Paris. The frame range associated with "Tom" may be 1-5, the frame range associated with "Jerry" may be 1-4, the frame range associated with "Jack" may be 6-10, the frame range associated with "Jill" may be 5-10, the frame ranges associated with "Eiffel Tower" may be 1-4 and "7-10" and the frame range associated with "Paris" may be 1-5. In other words, the frames from 1-5 may be tagged with the value "Tom". The frames from 1-4 may be tagged with value "Jerry" and so on. Using the event record, the processor may identify values associated with the received frame number. For example, the frame number 4 may be associated with the values "Tom", "Jerry", "Eiffel Tower", and "Paris" as these values are tagged to frame number 4 associated with the event ID 5. The attribute "Actors" along with the corresponding values "Tom" and "Jerry", the attribute "Landmark" and the corresponding value "Eiffel Tower", and the attribute "Location" along with the corresponding value "Paris" may be provided to the user on electronic device 109 as shown in FIG. 4c.

Figure 4D:
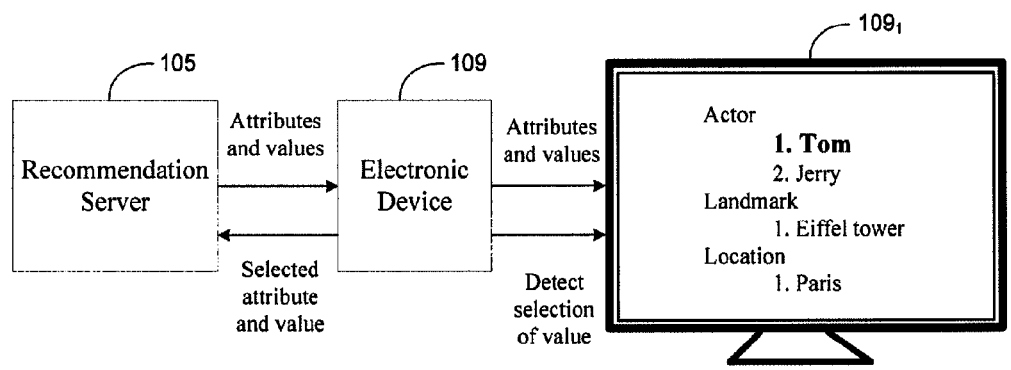
Figure 4E:
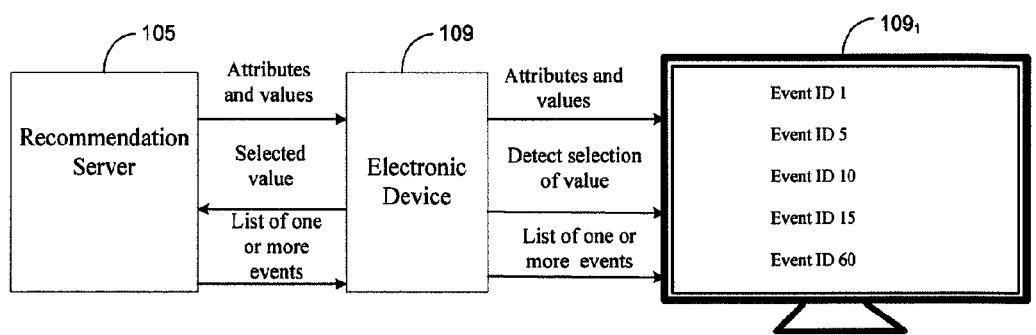
Figure 4F:
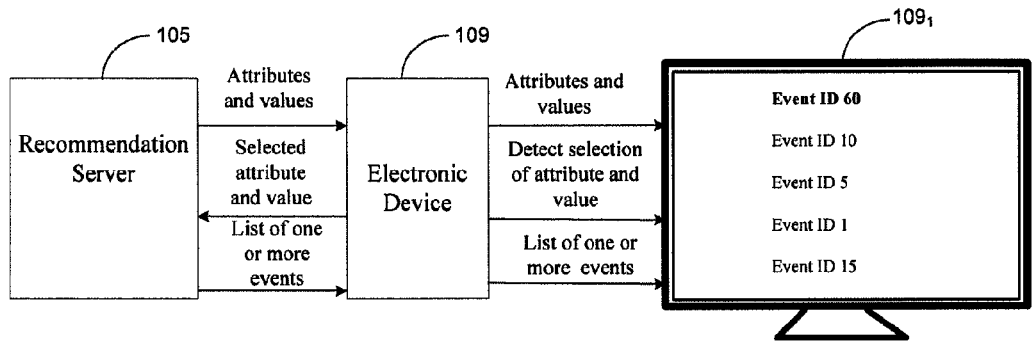

The electronic device 109 may display the identified attributes and values on the display 111 for selection by a user. The user may select the value "Tom" as shown in FIG. 4d. The electronic device 109 detects selection of the value. The electronic device 109 provides the selected value to the recommendation server 105. The processor in the recommendation server 105 searches the listing of plurality of events to determine one or more events having the selected value in the memory. The list of one or more events having the selected value may be event ID 1, event ID 5, event ID 10, event ID 15 and event ID 60 as shown in FIG. 4e. The processor may further retrieve the frame count for the identified value in each of the events. The frame count for the value "Tom" in the event corresponding to event ID 1 may be 5. The frame count for the value "Tom" in event 5 may be 10. The frame count for the value "Tom" in event 10 may be 12. The frame count for the value "Tom" in event 15 may be 3 and the frame count for the value "Tom" in the event 60 may be 20. The processor in the recommendation server 105 may order the list of one or more events based on the frame count in each of the one or more events. As per the frame count, the event 60 has highest frame count for the value "Tom" and the event ID 15 has the lowest frame count for the value "Tom". Therefore, the processor may order the list from highest to lowest i.e. event ID 60, event ID 10, event ID 5, event ID 1 and event ID 15 as shown in FIG. 4f. The user can select any of the events for viewing. When the user selects event ID 60, if the event corresponding to event ID 60 is being currently broadcasted on another channel, the user may be provided an option to directly jump to the other channel. In some embodiments, if the event associated with event ID 60 is about to be broadcasted at a later point of time, a reminder is set and the reminder message is displayed to the user when the event is available.

Figure 5:
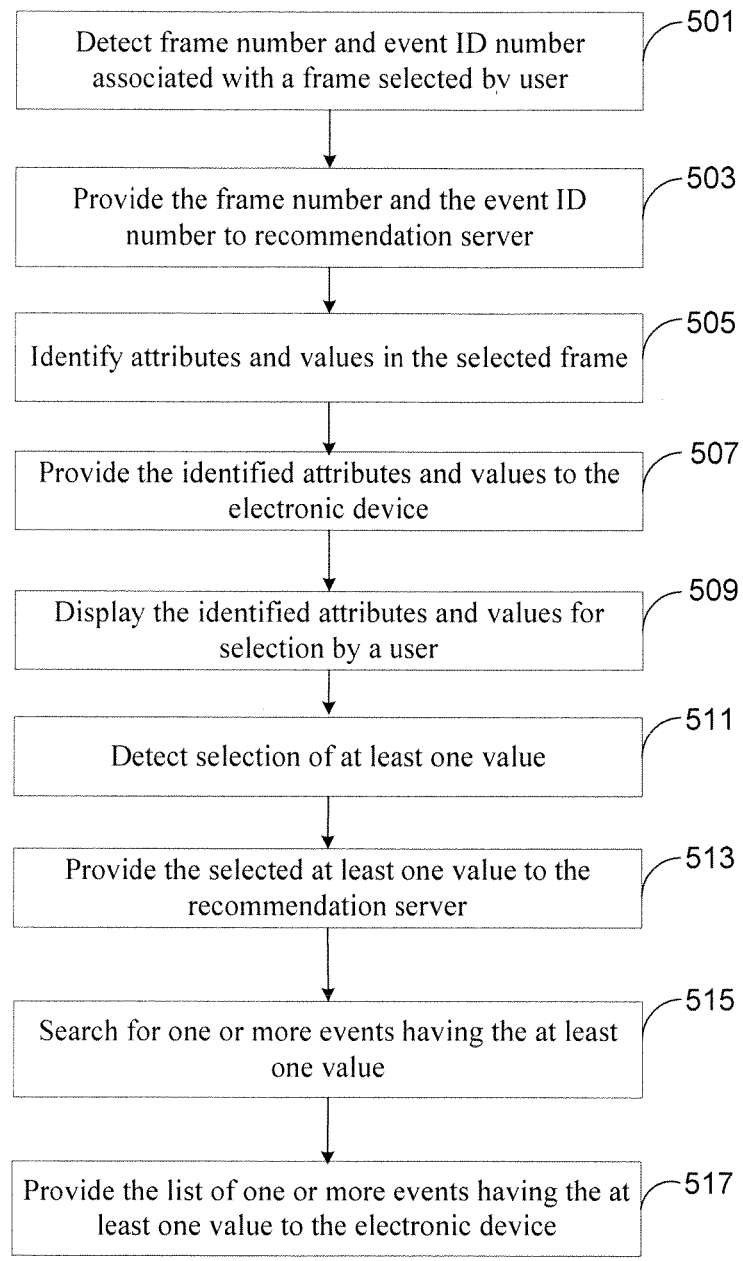
FIG. 5 shows a flowchart illustrating a method of recommending events on an electronic device in accordance with some embodiments of the present disclosure.

FIG. 5 shows a flowchart illustrating a method of recommending events on an electronic device 109 in accordance with an embodiment of the present disclosure. The content provider 103 provides one or more events to the electronic device 109 through a communication network 107. The electronic device 109 displays the events on the display 111. The user viewing the events selects a frame to obtain certain information. At step 501, the electronic device 109 detects the frame number and the event identification number associated with the frame selected by the user. At step 503, the electronic device 109 provides the frame number and the event ID number to the recommendation server 105. The processor in the recommendation server 105 compares the event ID number with plurality of event ID numbers stored in the memory to identify a matching event ID. The event corresponding to the matched event ID comprises attributes and values. Each value is associated with a set of frame ranges. The processor determines a frame range from among the set of frame ranges having the received frame number and identifies the attributes and values at step 505. The identified attributes and the values are provided to the electronic device 109 for selection from the user at step 507. The electronic device 109 displays the attributes and the values on the display 111 at step 509. The user may select at least one value from the list of attributes and the values being displayed on the display 111. At step 511, the electronic device 109 detects the selected value. The electronic device 109 provides the selected value to the recommendation server 105 at step 513. The recommendation server 105 searches the listing of the plurality of events to determine one or more events having the selected value at step 515. Thereafter, the recommendation server provides the list of one or more events having the selected value to the electronic device 109 at step 517.

Figure 6:
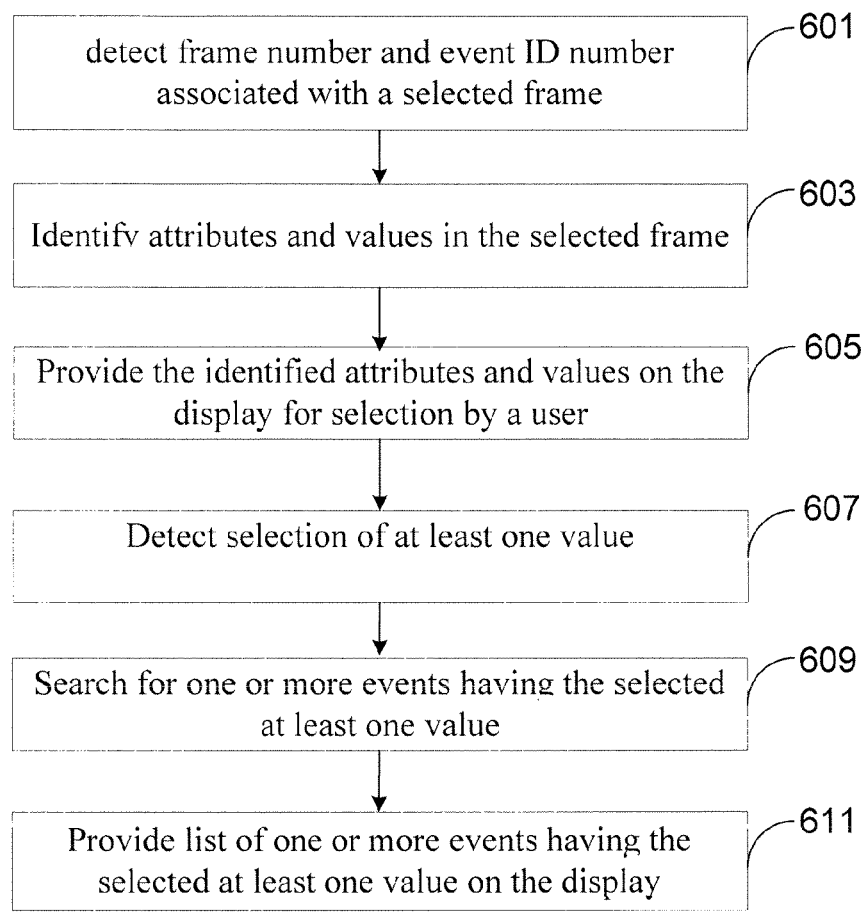
FIG. 6 shows a flowchart illustrating a method of recommending events by an electronic device in accordance with some embodiment of the present disclosure.

FIG. 6 shows a flowchart illustrating a method of recommending events by an electronic device 109 in accordance with an embodiment of the present disclosure. The content provider 103 provides one or more events to the electronic device 109 through a communication network 107. The processor in the electronic device 109 displays the events on the display. The user viewing the events selects a frame to obtain certain information. At step 601, the processor detects the frame number and the event ID number associated with the frame selected by the user. Thereafter, the processor compares the event ID number with plurality of event ID numbers stored in the memory to identify a matching event ID. The event corresponding to the matched event ID comprises attributes and values. Each value is associated with a set of frame ranges. The processor determines a frame range from among the set of frame ranges having the received frame number to identify the attributes and values in the selected frame at step 603. The identified attributes and the values are provided to the display for selection from the user at step 605. The user may select at least one value from the list of attributes and the values being displayed on the display. At step 607, the processor detects the selected value and searches the listing of the plurality of events to determine one or more events having the selected value at step 609. Thereafter, the processor may provide the list of one or more events having the selected value to the display at step 611.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 5 & 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processor or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

Additionally, advantages of present disclosure are illustrated herein.

The present disclosure provides a method for recommending events on an electronic device by reducing the complexity of searching the entire EPG. The present disclosure enables a user to find programs or events having attributes or values similar to the attributes in a preferred event. Thus, a user may easily find preferred content without manually scrolling through or searching a program or event list or an EPG.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for recommending one or more events on an electronic device, the method comprising:
   receiving, by a recommendation server, an event identification (ID) number and a frame number associated with a frame selected by a user;
   identifying, by the recommendation server, at least one attribute and at least one value associated with each of the at least one attribute in the frame, wherein the identifying comprises:
   comparing, by the recommendation server, the received event ID number with a plurality of event ID numbers to identify a matching event ID number, wherein an event corresponding to the matched event ID number comprises at least one attribute and at least one value associated with a set of frame ranges;
   determining, by the recommendation server, a frame range, from among the set of frame ranges, having the received frame number;
   retrieving, by the recommendation server, the at least one attribute and the at least one value associated with the determined frame range;
   searching, by the recommendation server, a listing of a plurality of events to determine one or more events having the at least one value; and
   providing, by the recommendation server, a list of the one or more events having the at least one value to the electronic device.

2. The method as claimed in claim 1 further comprising providing, by the recommendation server, the at least one attribute and the at least one value to the electronic device for selection of the at least one value by the user.

3. The method as claimed in claim 1 further comprising identifying, by the recommendation server, a number of frames in each of the one or more events having the at least one value.

4. The method as claimed in claim 3, wherein the list of the one or more events is ordered based on the number of frames in each of the one or more events having the at least one value.

5. A method for recommending one or more events, the method comprising:
   receiving, by an electronic device, a selection of a frame from an event provided to a user;
   identifying, by the recommendation server, at least one attribute and at least one value associated with each of the at least one attribute in the frame, wherein the identifying comprises;
   comparing, by the recommendation server, the received event ID number with a plurality of event ID numbers to identify a matching event ID number, wherein an event corresponding to the matched event ID number comprises at least one attribute and at least one value associated with a set of frame ranges;
   determining, by the recommendation server, a frame range, from among the set of frame ranges, having the received frame number;
   retrieving, by the recommendation server, the at least one attribute and the at least one value associated with the determined frame range; and
   searching, by the electronic device, a listing of a plurality of events to determine one or more events having the at least one value; and providing, by the electronic device, a list of the one or more events having the at least one value to a display.

6. The method as claimed in claim 5 further comprising providing, by the electronic device, the at least one attribute and the at least one value to the display for selection of the at least one value.

7. A recommendation server, comprising:
   at least one processor; and
   at least one memory coupled to the processor configured to execute programmed instructions stored in the memory comprising:
   receiving an event identification (ID) number and a frame number associated with a frame selected by a user;
   identifying, by the recommendation server, at least one attribute and at least one value associated with each of the at least one attribute in the frame, wherein the identifying comprises:
   comparing, by the recommendation server, the received event ID number with a plurality of event ID numbers to identify a matching event ID number, wherein an event corresponding to the matched event ID number comprises at least one attribute and at least one value associated with a set of frame ranges;
   determining, by the recommendation server, a frame range, from among the set of frame ranges, having the received frame number;

retrieving, by the recommendation server, the at least one attribute and the at least one value associated with the determined frame range;

searching a listing of a plurality of events to determine one or more events having the at least one value; and providing a list of the one or more events having the at least one value.

8. The recommendation server as claimed in claim 7, wherein the processor is further configured to execute programmed instructions stored in the memory further comprising providing the at least one attribute and the at least one value to the electronic device for selection of the at least one value by the user.

9. The recommendation server as claimed in claim 7, wherein the processor is further configured to execute programmed instructions stored in the memory further comprising identifying a number of frames in each of the one or more events having the at least one value.

10. The recommendation server as claimed in claim 9, wherein the processor is further configured to execute programmed instructions stored in the memory further comprising ordering the list of one or more events based on the number of frames in each of the one or more events having the at least one value.

11. An electronic device, comprising: at least one processor; and at least one memory coupled to the processor configured to execute programmed instructions stored in the memory comprising:

receiving a selection of a frame from an event provided to a user;

identifying, by the recommendation server, at least one attribute and at least one value associated with each of the at least one attribute in the frame, wherein the identifying comprises:

comparing the received event ID number with a plurality of event ID numbers to identify a matching event ID number, wherein an event corresponding to the matched event ID number comprises at least one attribute and at least one value associated with a set of frame ranges;

determining a frame range, from among the set of frame ranges, having the received frame number;

retrieving the at least one attribute and the at least one value associated with the determined frame range;

searching a listing of a plurality of events to determine one or more events having the at least one value; and providing a list of the one or more events having the at least one value to a display.

12. A non-transitory computer readable medium having stored thereon instructions for recommending one or more events comprising executable code which when executed by a processor, causes the processor to perform steps comprising:

receiving an event identification (ID) number and a frame number associated with a frame selected by a user;

identifying, by the recommendation server, at least one attribute and at least one value associated with each of the at least one attribute in the frame, wherein the identifying comprises:

comparing the received event ID number with a plurality of event ID numbers to identify a matching event ID number, wherein an event corresponding to the matched event ID number comprises at least one attribute and at least one value associated with a set of frame ranges;

determining a frame range, from among the set of frame ranges, having the received frame number;

retrieving the at least one attribute and the at least one value associated with the determined frame range;

searching a listing of a plurality of events to determine one or more events having the at least one value; and providing a list of the one or more events having the at least one value to the electronic device.

13. The medium as claimed in claim 12, further comprising providing the at least one attribute and the at least one value to the electronic device for selection of the at least one value by the user.

14. The medium as claimed in claim 12, further comprising identifying a number of frames in each of the one or more stored events, of the retrieved list, having the identified at least one value.

15. The medium as claimed in claim 14, further comprising ordering the list of one or more events based on the number of frames in each of the one or more events having the at least one value.

* * * * *